United States Patent Office 2,803,568
Patented Aug. 20, 1957

2,803,568

PROCESS OF FRACTIONATING STARCH

Willem Christiaan Bus, The Hague, and Johannes Muetgeert, Rotterdam, Netherlands, assignors to Coöperatieve Verkoop-en Productievereniging van Aardappelmeel en Derivaten "Avebe" G. A., Veendam, Netherlands No Drawing. Application June 12, 1952,
Serial No. 293,214

Claims priority, application Netherlands June 22, 1952

5 Claims. (Cl. 127—71)

Most natural starches are now considered as mixtures of at least two components; one fraction is essentially linear in molecular configuration and is referred to as amylose or as the A-fraction and the other is of branched molecular configuration and is named amylopectin or the B-fraction.

The invention relates to a process for fractionation of starch in these two components. Various processes have been proposed for the fractionation of starch solutions into these components. The older methods are not suitable for large scale manufacturing processes. Only the process according to Schoch, can be applied in practice. In the Schoch process starch is fractionated by cooling a solution of starch in a water-alcohol medium, containing about 10–15 volume percent of an aliphatic alcohol having from 1–5 carbon atoms, which is for the higher alcohols a saturated solution. On slowly cooling the amylose is precipitated, and after separation of the A-fraction from the solution, on further cooling to temperatures near 0° C., the amylopectin precipitates and is separated. For separation of the amylose-precipitate a continuous flow supercentrifuge is necessary.

It is the main object of the present invention to provide an improved process for fractionation of starch into fractions, one of which has a high grade of purity. A further object is to provide a process, wherein the fractions are precipitated in a form which is easily separated from the fractionation medium. Other objects of the invention will be apparent from the following specification and from the claims.

We have found that on cooling a solution of starch in a fractionation medium consisting of mixtures of different organic liquids of the suitable type as described hereinafter, and water, containing the organic liquid in a concentration substantially below the concentration of a saturated solution at room temperature, e. g. 23° C., the amylose precipitates in a purer form than from a saturated solution, and that the precipitate can be easily separated from the solution by a normal centrifuge. On addition of a further quantity of an organic liquid hereinafter referred to as the amylopectin precipitating organic liquid, and which may be the same liquid as before mentioned, but also a lower alcohol, to the solution and on further cooling to about zero, the amylopectin precipitates, and can be recovered by centrifugation or sedimentation and decantation of the supernatant liquid.

Organic liquids which are suitable for the process of the invention are:

Organic aliphatic alcohols, containing at least 4 carbon atoms, as e. g. tertiary, secondary and primary butyl alcohol, amyl alcohol, hexyl alcohol, up to capryl alcohol; ketones as isopropylketone and isoamylketone; substituted aldehydes as e. g. chloral hydrate; but always in a concentration considerably below the concentration of a saturated solution. Hereinafter these liquids and mixtures of these liquids are referred to as "an organic liquid of the suitable type."

Very favourable results are achieved with solutions of n butyl alcohol, of isopentanol, of capryl alcohol (n octylalcohol) and of di-isopropylketone. The concentration of the starch may be about 5%; optimal purity of the amylose precipitate is obtained at starch concentrations of about 0.5–1.5%. The starch solutions can be made by mixing starch into water in the desired quantity and boiling it for about half an hour at 100° C., addition of concentrated NaOH solution to a concentration in the starch solution of 0.2% and stirring for half an hour on slowly cooling to 80° C., cooling to room temperature and neutralizing with a mineral acid.

For fractionation the required quantity of the organic liquid can be added to this solution, and on standing the amylose precipitates. On addition of a further quantity of the same organic liquid or another liquid as e. g. methyl-alcohol or ethylalcohol and cooling to a temperature of about 3° C., the amylopectin is precipitated. Also without further addition of organic liquids on prolonged standing at a temperature of about 0° C. the amylopectin precipitates from the solution in many cases.

However, the starch may also be dissolved by autoclaving it with water, and it is also possible sometimes to dissolve the starch in the mixture of water and organic liquid, whereafter on cooling to room temperature the amylose precipitates, and on further cooling to near 0° C. the amylopectin. To elucidate the invention in the following Table I are shown the results of addition of varying quantities of isopentanol at a pH of about 7 and a temperature of 23° C. to samples of a starch solution, having a concentration of about 1%, which was made by dissolving starch in boiling water as described hereinbefore.

Table 1

| Isopentanol conc., vol. percent | Percent in weight of the precipitate calculated on starting mat., centrifuged after— | | | | Total | Amylose content of the precipitate, percent |
|---|---|---|---|---|---|---|
| | 4 h. | 24 h. | 48 h. | 190 h. | | |
| 0.0 | | 0.20 | | | 0.2 | |
| 1.0 | | 0.26 | | | 0.3 | |
| 1.5 | 0.0 | 11.14 | 8.53 | 1.44 | 21.1 | 85 |
| 2.0 | 21.6 | 21.66 | | | 21.7 | 95 |
| 2.5 | | 21.69 | | 0.60 | 22.3 | 95 |
| 3.0 | 10.1 | 12.14 | 3.91 | 3.37 | 19.4 | 90 |
| 3.5 | 11.3 | 17.71 | 1.70 | 0.77 | 20.2 | 90 |
| 4.0 | | 17.82 | 0.82 | 0.85 | 19.5 | 80 |
| 6.0 | | 16.11 | 2.60 | | 18.7 | 75 |

From the result, given in this table, it is clear, that the precipitate is formed at its quickest and has the highest purity at an isopentanol concentration of 2–2½%. The amylose, precipitated at this concentration of isopentanol can easily be centrifuged out, whereas at an isopentanol addition of 3% and higher, precipitation is much slower and at a concentration, higher than 2–2.5% of amylalcohol, it becomes more difficult to separate the precipitate from the solution by means of the separator used, and this claim the more as the concentration gets higher, no fractionation of the amylose takes place at isopentanol concentrations below about 1.25%.

Also other organic compounds, as mentioned proved to be suitable for the separation of amylose and also proved to have a similar critical concentration range; in Table II the critical concentrations of some of them are shown, as well as the saturation concentration at 23° C.

Table II

| Fractionating means | crit. conc. in vol. percent | saturat. conc., percent | perc. of amylose precipit. | purity of precip. amylose, percent |
| --- | --- | --- | --- | --- |
| butanol | about 5 | 8 | 18.6 | 90 |
| n hexanol | about 0.3 | 0.6 | | |
| di-isopropylketone | about 0.6 | 1 | 27 | 80 |

Also at higher temperatures the above mentioned concentrations proved to have the most favourable effect.

Of the varying substances, suitable for this fractionating amyl alcohol has a very favourable effect. Water, wherein amyl alcohol has been dissolved in critical concentration, which is lower than the saturation concentration gives quickly a precipitation of the amylose and at this concentration, within a short period of time, practically the entire theoretical quantity of amylose is precipitated in such a form that it can easily be separated from the solution, and in a practically pure state.

The highest grade of purity was obtained (approximately 95%), on separation of the amylose at a temperature of 20-35° C. At this temperature the amylose is precipitated after approximately two hours. The amylose precipitate is formed quicker at higher temperatures, but the product is less pure; at lower temperatures the flocculation time becomes longer, without compensating advantages.

To obtain the optimal purity the starch concentration has preferably to be 0.5-1.5%. The purity of the separated amylose is lower at starch concentrations of 4-5% and higher.

If less high demands are made upon the purity, it is however advantageous to have the amylose separated from a concentrated starch solution and at a higher temperature.

It is e. g. possible to obtain about 80% of the amylose in approximately one hour of time by the use of a starch concentration of 3-5% and after the addition of 2% of amyl alcohol and cooling to 45-50° C. The precipitate has then an amylose content of approximately 80+90%.

It was found that the fractionation can be carried out over a great pH-range, i. e. between 1-11; when the pH is higher than 11 a proper fractionation is no longer possible. At a pH lower than 5.5 degradation processes of the starch must be prevented by avoiding a raise of temperature and similar measures. By making use of the fractionated precipitation at a higher pH-value it proved moreover to be possible to work according to a simple, continuous process. For this purpose is dissolved starch in concentration of e. g. 1.5% in a 0.001 n solution of NaOH containing 2% of amyl alcohol, by heating under reflux. This solution is centrifuged or sifted in a hot state in order to remove a few non-dissolved rests and is thereupon allowed to cool to room temperature, at which stage the amylose separates out.

After centrifuging the amylose the remaining solution is cooled for some time at a temperature of about 0° C., by which a gel is formed from which by centrifuging about 80% of the amylopectin, present in the solution, can be separated. The centrifuge is again used for the dissolving of starch and from said solution amylose can be precipitated anew by cooling to room temperature, etc.

Also capryl alcohol and di-isopropylketone proved to be very suitable and are moreover attractive because of their low cost.

It proved to be possible to fractionate in this way all kinds of starch, having a reasonable amylose content.

We claim:

1. In a process of recovering amylose from starch comprising the cooling of an aqueous solution of starch to room temperature to effect precipitation of the amylose content of said starch, said solution having been prepared by dissolving starch in the solution at the boiling point thereof, the improvement comprising the addition to said solution of a compound from the group consisting of amyl alcohol, butyl alcohol, capryl alcohol and di-isopropyl ketone, said compound, when amyl alcohol, being present in the solution from 1 to about 3.5 volume percent, when butyl alcohol, being present in the solution in about 5 volume percent, when capryl alcohol, being present in the solution in about 0.025 to about 0.050 volume percent, and when di-isopropyl ketone, being present in the solution in from about 0.4 to about 0.8 volume percent.

2. The process of recovering amylose from starch comprising dissolving the starch in an aqueous solution of a compound of the group consisting of amyl alcohol, butyl alcohol, capryl alcohol and di-isopropyl ketone, said compound, when amyl alcohol, being present in from 1 to about 3.5 volume percent, when butyl alcohol, being present in about 5 volume percent, when capryl alcohol, being present in about 0.025-0.050 volume percent, and when di-isopropyl ketone, being present in from about 0.4 to about 0.8 volume percent, said starch being dissolved at a temperature of at least the boiling point of the solution, slowly cooling the solution to a temperature not below room tempertaure to effect precipitation of the amylose, and separating the amylose from the mother liquor.

3. The process of fractionating starch into amylose and amylopectin comprising dissolving the starch in an aqueous solution of a compound of the group consisting of amyl alcohol, butyl alcohol, capryl alcohol and di-isopropyl ketone, said compound, when amyl alcohol, being present in from 1 to about 3.5 volume percent, when butyl alcohol, being present in about 5 volume percent, when capryl alcohol being present in about 0.025-0.050 volume percent and said compound when di-isopropyl ketone being present in from about 0.4 to about 0.8 volume percent, said starch being dissolved at a temperature of at least the boiling point of the solution, slowly cooling the solution to a temperature not below room temperature to effect precipitation of the amylose, separating the amylose from the mother liquor, cooling the remaining solution to a temperature of about 0° C. to effect precipitation of the amylopectin, and separating the amylopectin.

4. The process of recovering amylose from starch comprising dissolving starch in a medium consisting essentially of water at a temperature of at least the boiling point of the medium, the concentration of said starch in the medium not exceeding 5 percent by weight, cooling the solution to a temperature of between 15 and 50° C., adding to the solution a compound from the group consisting of amyl alcohol, butyl alcohol, capryl alcohol and di-isopropyl ketone, said compound, when amyl alcohol, being present in the solution in an amount ranging from about 1.5 to about 3.5 volume percent, when butyl alcohol, being present in about 5 volume percent, when capryl alcohol, being present in from about 0.8 volume percent, and separating the amylose thus isopropyl ketone being present in from about 0.4 to about 0.8 volume percent, and separating the amylose thus precipitated.

5. The process of fractionating starch into amylose and amylopectin comprising dissolving starch in a medium consisting essentially of water at a temperature of at least the boiling point of the medium, the concentration of said starch in the medium not exceeding 5 percent by weight, cooling the solution to a temperature of between 15 and 50° C., adding to the solution a compound from the group consisting of amyl alcohol, butyl alcohol, capryl alcohol and di-isopropyl ketone, said compound, when amyl alcohol, being present in the solution in an amount ranging from about 1.5 to about 3.5 volume percent, when butyl alcohol, being present in about 5 volume percent, when capryl alcohol, being present in from about 0.025 to about 0.050 volume percent and when di-isopropyl ketone being present in from about 0.4 to about 0.8 volume percent, separating the amylose thus precipitated, adding to the solution an amylopectin precipitating organic liquid, cooling the solution to a temperature of 0–5° C. to effect precipitation of the amylopectin and thereafter separating the amylopectin from the solution.

References Cited in the file of this patent

UNITED STATES PATENTS 2,515,095     Schoch _____ July 11, 1950

UNITED STATES PATENT OFFICE

CERTIFICATE OF CORRECTION

Patent No. 2,803,568                                                August 20, 1957

Willem Christiaan Bus et al.

It is hereby certified that error appears in the printed specification of the above numbered patent requiring correction and that the said Letters Patent should read as corrected below.

Column 1, line 35, for "solutioh" read --solution--; column 3, Table II, first, second, third, fourth and fifth columns thereof, strike out "n hexanol---- about 0.3     0.6    -------   ------"

and insert instead capryl alcohol---- about 0.035    0.13    15.5       85

Signed and sealed this 26th day of November 1957.

(SEAL)
Attest:

KARL H. AXLINE
Attesting Officer

ROBERT C. WATSON
Commissioner of Patents